United States Patent
Lin et al.

(10) Patent No.: US 10,256,664 B2
(45) Date of Patent: Apr. 9, 2019

(54) COMBINABLE POWER SOCKET SYSTEM

(71) Applicants: Yi-Bing Lin, Hsinchu (TW); Chun-Ming Huang, Hsinchu (TW); Gang-Neng Sung, Hsinchu (TW); Chien-Ming Wu, Hsinchu (TW)

(72) Inventors: Yi-Bing Lin, Hsinchu (TW); Chun-Ming Huang, Hsinchu (TW); Gang-Neng Sung, Hsinchu (TW); Chien-Ming Wu, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 180 days.

(21) Appl. No.: 15/346,718

(22) Filed: Nov. 8, 2016

(65) Prior Publication Data

US 2018/0115192 A1 Apr. 26, 2018

(30) Foreign Application Priority Data

Oct. 20, 2016 (TW) .............................. 105133828 A

(51) Int. Cl.
*H02J 7/00* (2006.01)
*H02M 7/04* (2006.01)
*H02J 13/00* (2006.01)

(52) U.S. Cl.
CPC ........ *H02J 13/0075* (2013.01); *H02J 13/002* (2013.01); *H02M 7/04* (2013.01); *H02J 2007/0062* (2013.01); *Y02B 90/2615* (2013.01); *Y02B 90/2653* (2013.01); *Y04S 40/121* (2013.01); *Y04S 40/126* (2013.01)

(58) Field of Classification Search
CPC .... H02J 13/0075; H02M 7/04; H01R 13/665; H01R 43/26
See application file for complete search history.

(56) References Cited

U.S. PATENT DOCUMENTS

| 9,219,525 B2* | 12/2015 | Liu .......................... H04B 3/54 |
| 2011/0156496 A1 | 6/2011 | Lee et al. |
| 2015/0220138 A1 | 8/2015 | Jones et al. |
| 2015/0380932 A1 | 12/2015 | Karle |
| 2016/0344138 A1* | 11/2016 | Kazmier .............. G01R 21/133 |

* cited by examiner

*Primary Examiner* — Jeffrey M Shin

(57) ABSTRACT

An intelligent power socket system is disclosed. The system is composed of a control module, a switched electricity receptacle module, a switched USB module and a dimming receptacle module. Each module has a power plug and a power socket. The control module can receive control commands from a smartphone by a user. The other three functional modules can be controlled by the control module through power line communication (PLC). The modules may be located at different places within an electricity supply division so that they can communicate through the power lines.

7 Claims, 9 Drawing Sheets

US 10,256,664 B2

COMBINABLE POWER SOCKET SYSTEM

BACKGROUND OF THE INVENTION

1. Technical Field

The invention relates to power devices, particularly to multifunctional controllable power receptacles.

2. Related Art

With the coming of high oil price and the increasingly seriousness of global warming problem, customers progressively place great emphasis on energy saving and carbon reduction. Therefore, various products featuring energy saving and carbon reduction appear on the markets. Among these products, a smart power socket draws many customers' attention. Such a smart power socket is of a type of an independent module, whose housing is provided with a plug and a socket and whose inside is provided with a wireless communication device, a control unit and a switch device. The plug is used to be inserted into a wall electricity socket for introducing AC power into the module. The socket electrically connects to the switch device. The wireless communication device is capable of wirelessly connecting a smartphone (usually via the Wi-Fi protocol). Users may transmit various control signals from a smartphone to the wireless communication device, then the control unit reads out the control signal, and finally the control unit sends a switch signal to the switch device instantly or at a desired time to switch on or off electricity supply of the socket.

Such a wireless type of smart power sockets are also able to link other modules located at different places for performing synchronous or asynchronous control. However, as known by the public, wireless communication is easy to be attenuated or interfered by partition walls or other wireless signal or noise sources. When multiple modules are located at different rooms or spaces, the wireless communication between these modules is hard to keep normal. Once the wireless communication cannot normally work, control to the multiple modules will malfunction. This is a serious drawback.

SUMMARY OF THE INVENTION

An object of the invention is to provide a combinable power socket system, which is composed of multiple independent modules with different functions. The modules can be interconnected through a stable power line network without the limit of wireless communication which tends to be interfered and attenuated.

To accomplish the above object, the combinable power socket system of the invention includes a control module, a switched power socked module, a switched universal serial bus (USB) socket module and a dimming power socket module. The control module includes: a housing; a power plug, disposed on the housing; a power socket, disposed on the housing, and electrically connected to the power plug; a microprocessor, disposed in the housing; a power line communication (PLC) modulation/demodulation (modem) circuit, disposed in the housing, electrically connected to the power plug and the microprocessor for modulating a control signal from the microprocessor, sending a modulated control signal to a power line network, and receiving and demodulating a feedback signal from the power line network; a wireless communication circuit, disposed in the housing, electrically connected to the microprocessor for wirelessly connecting a handheld computer; and an AC/DC converting circuit, disposed in the housing, electrically connected to the power plug for converting AC electricity from the power plug into DC power to supply DC power to the microprocessor, the PLC modem circuit and the wireless communication circuit.

The switched power socked module includes: a housing; a power plug, disposed on the housing; an unswitched power socket, disposed on the housing, and electrically connected to the power plug; a microprocessor, disposed in the housing; a switch device, disposed in the housing, electrically connected to the microprocessor and the power plug, and being controlled to switch on/off by the microprocessor; a switched power socket, disposed on the housing, and electrically connected to the switch device for outputting electricity switched by the switch device; a power line communication (PLC) modulation/demodulation (modem) circuit, disposed in the housing, electrically connected to the power plug and the microprocessor for receiving and demodulating a switch control signal from the power plug, modulating a status signal of the switched power socket from the microprocessor, and sending a modulated status signal to a power line network through the power plug; and an AC/DC converting circuit, disposed in the housing, electrically connected to the power plug for converting AC electricity from the power plug into DC power to supply DC power to the microprocessor and the PLC modem circuit.

The switched USB socket module includes: a housing; a power plug, disposed on the housing; a power socket, disposed on the housing, and electrically connected to the power plug; a microprocessor, disposed in the housing; a switch device, disposed in the housing, electrically connected to the microprocessor, and being controlled to switch on/off by the microprocessor; a switched USB socket, disposed on the housing, and electrically connected to the switch device for outputting electricity switched by the switch device; a power line communication (PLC) modulation/demodulation (modem) circuit, disposed in the housing, electrically connected to the power plug and the microprocessor for receiving and demodulating a switch control signal from the power plug, modulating a status signal of the switched USB socket from the microprocessor, and sending a modulated status signal to a power line network through the power plug; and an AC/DC converting circuit, disposed in the housing, electrically connected to the power plug for converting AC electricity from the power plug into DC power to supply DC power to the microprocessor, the switch device and the PLC modem circuit.

The dimming power socket module includes: a housing; a power plug, disposed on the housing; an unswitched power socket, disposed on the housing, and electrically connected to the power plug; a microprocessor, disposed in the housing; a dimmer device, disposed in the housing, electrically connected to the microprocessor and the power socket, and being controlled to change an electricity outputting waveform thereof by the microprocessor; a dimming power socket, disposed on the housing, and electrically connected to the dimmer device for outputting electricity controlled by the dimmer device; a power line communication (PLC) modulation/demodulation (modem) circuit, disposed in the housing, electrically connected to the power plug and the microprocessor for receiving and demodulating a dimming control signal from the power plug, modulating a status signal of the dimming power socket from the microprocessor, and sending a modulated status signal to a power line network through the power plug; and an AC/DC converting circuit, disposed in the housing, electrically connected to the power plug for converting AC electricity from the power plug into DC power to supply DC power to the microprocessor and the PLC modem circuit.

DETAILED DESCRIPTION OF THE INVENTION

The combinable power socket system of the invention includes a control module, a switched power socked module, a switched universal serial bus (USB) socket module and a dimming power socket module. The control module is a control center and the other three modules are functional modules. The functional modules can be connectively controlled by the control module only when they are linked through a power line network. The control module can be linked with any one, two or three of the functional modules. And each kind of the functional modules which can be linked with the control module is not limited to one in number. Each functional module has a unique identification code for being identified by the control module so that independent control to any specific functional module can be accomplished.

Figure 1:
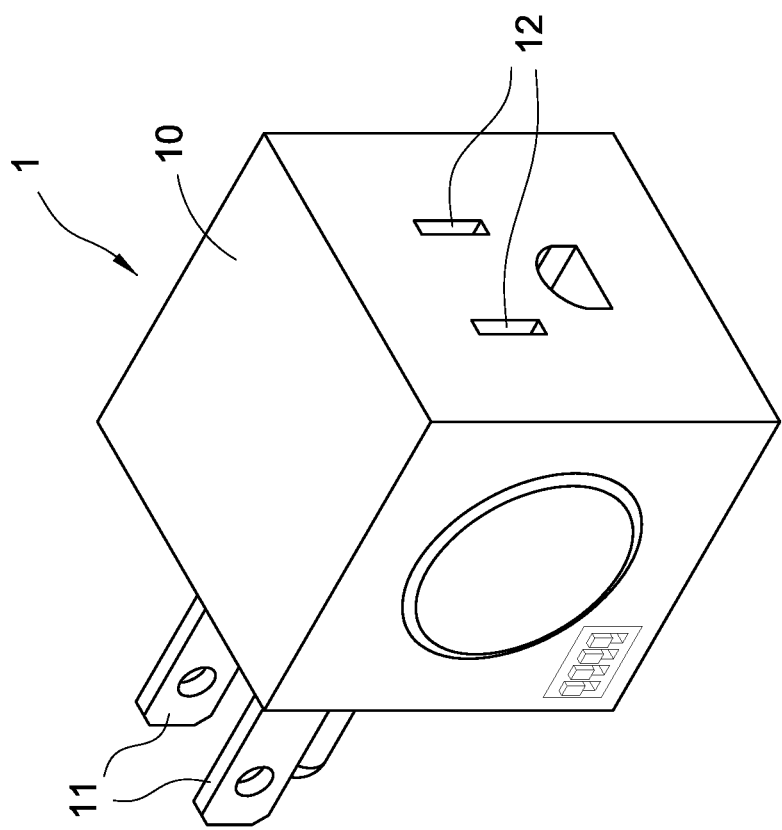
FIG. 1 is a perspective appearance diagram of the control module of the invention.
Figure 2:
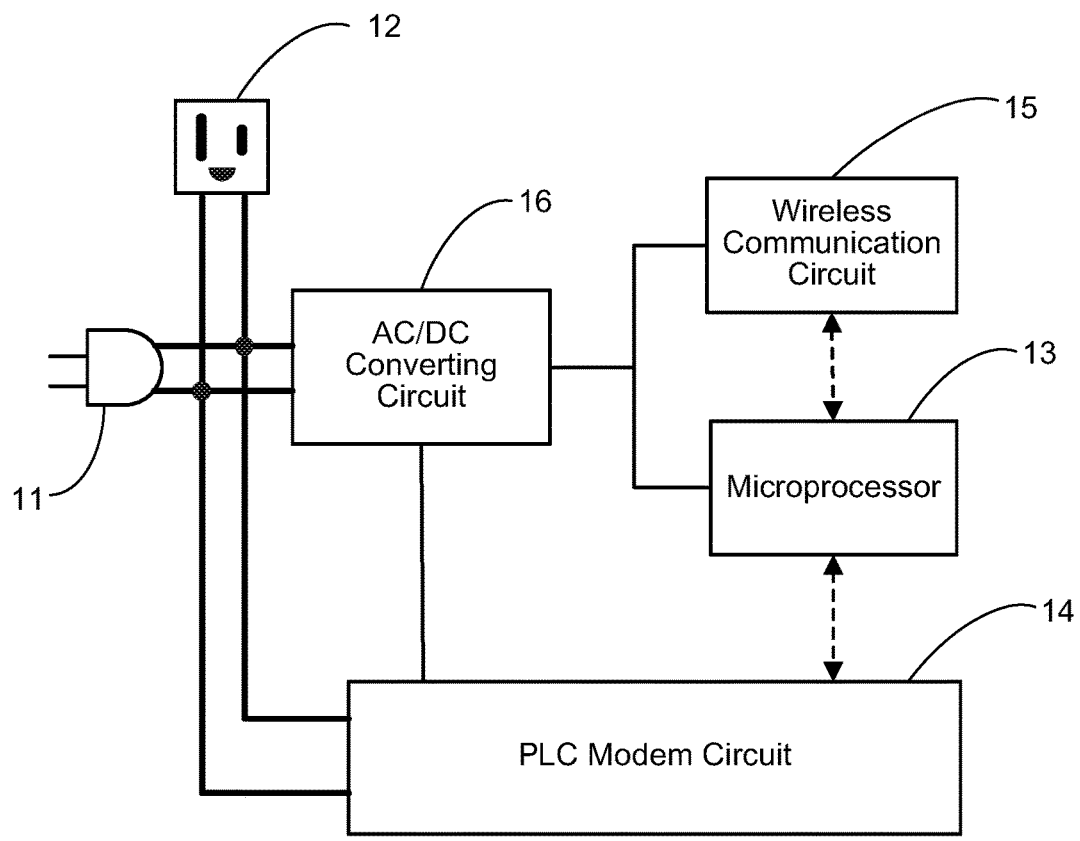
FIG. 2 is a circuit diagram of the control module of the invention.

Please refer to FIGS. 1 and 2, which are appearance diagram and circuit diagram of the control module, respectively. In FIG. 2, bold solid lines stand for AC power lines, normal solid lines stand for DC power lines and broken lines stand for signal lines.

The control module 1 includes a housing 10. In the shown embodiment, the housing 10 is a cube in shape, but not limited to this shape, cuboid or other shapes are also available. A power plug 11 is disposed on one side of the housing 10 for being inserted into a wall electricity socket. Another side of the housing 10 is provided with a power socket 12 which is electrically connected to the power plug 11 in parallel for being inserted by an electric apparatus. The inside of the housing 10 is provided with a microprocessor 13, a power line communication (PLC) modulation/demodulation (modem) circuit 14, a wireless communication circuit 15 and an AC/DC converting circuit 16. The PLC modem circuit 14 is electrically connected to the power plug 11 and the microprocessor 13 for modulating a control signal from the microprocessor 13, sending a modulated control signal to a power line network, and receiving and demodulating a feedback signal from the power line network. The wireless communication circuit 15 is electrically connected to the microprocessor 13 for wirelessly connecting a handheld computer of a user, such as a smartphone or tablet. The wireless communication may adopt the Wi-Fi or Bluetooth protocol. The AC/DC converting circuit 16 is electrically connected to the power plug 11 for converting AC electricity from the power plug into DC power to supply DC power to the microprocessor 13, the PLC modem circuit 14 and the wireless communication circuit 15.

Figure 3:
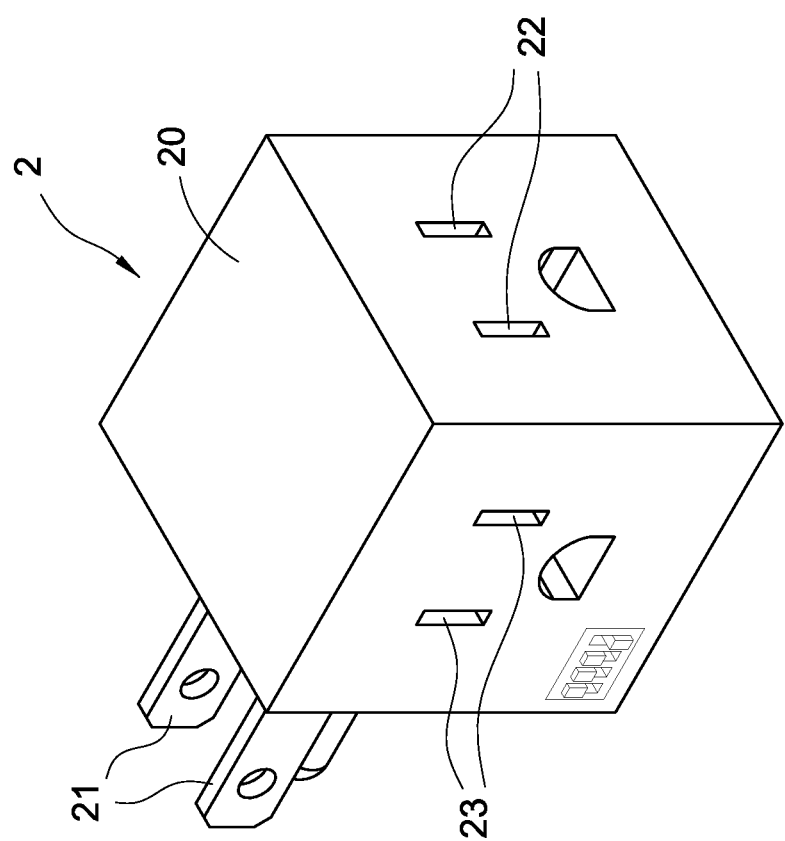
FIG. 3 is a perspective appearance diagram of the switched power socked module of the invention.
Figure 4:
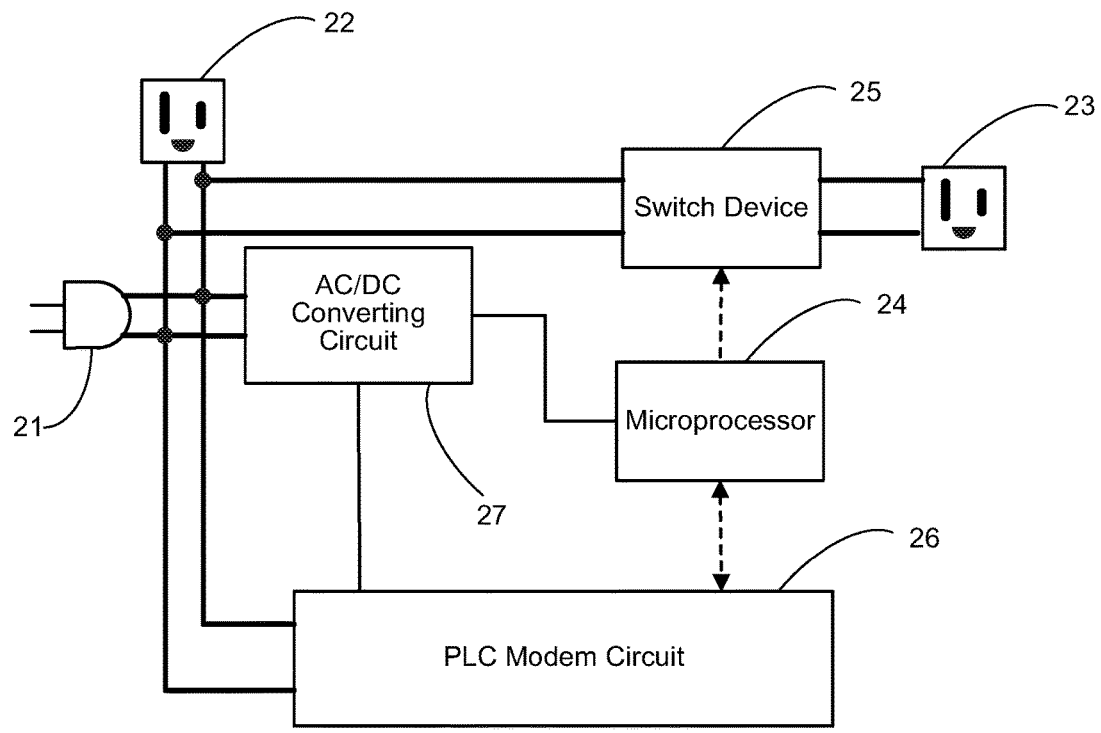
FIG. 4 is a circuit diagram of the switched power socked module of the invention.

Please refer to FIGS. 3 and 4, which are appearance diagram and circuit diagram of the switched power socked module 2, respectively. The switched power socked module 2 includes a housing 20. A power plug 21 is disposed on one side of the housing 20 for being inserted into a wall electricity socket. Another side of the housing 20 is provided with an unswitched power socket 22 which is electrically connected to the power plug 21 in parallel for being inserted by an electric apparatus to supply continuous AC power. A switched power socket 23 is disposed on another side of the housing 20 for supplying interruptible AC power. The inside of the housing 20 is provided with a microprocessor 24, a switch device 25, a PLC modem circuit 26 and an AC/DC converting circuit 27. The switch device 25 is a relay electrically connected to the microprocessor 24 and the power plug 21, and controlled to switch on/off by the microprocessor 24. The switch power socket 23 is electrically connected to the switch device 25 for outputting electricity switched by the switch device 25. The PLC modem circuit 26 is electrically connected to the power plug 21 and the microprocessor 24 for receiving and demodulating a switch control signal from the power plug 23, modulating a status signal of the switched power socket 23 from the microprocessor 24, and sending a modulated status signal to the power line network through the power plug 21. The AC/DC converting circuit 27 is electrically connected to the power plug 21 for converting AC electricity from the power plug 21 into DC power to supply DC power to the microprocessor 24 and the PLC modem circuit 26.

Figure 5:
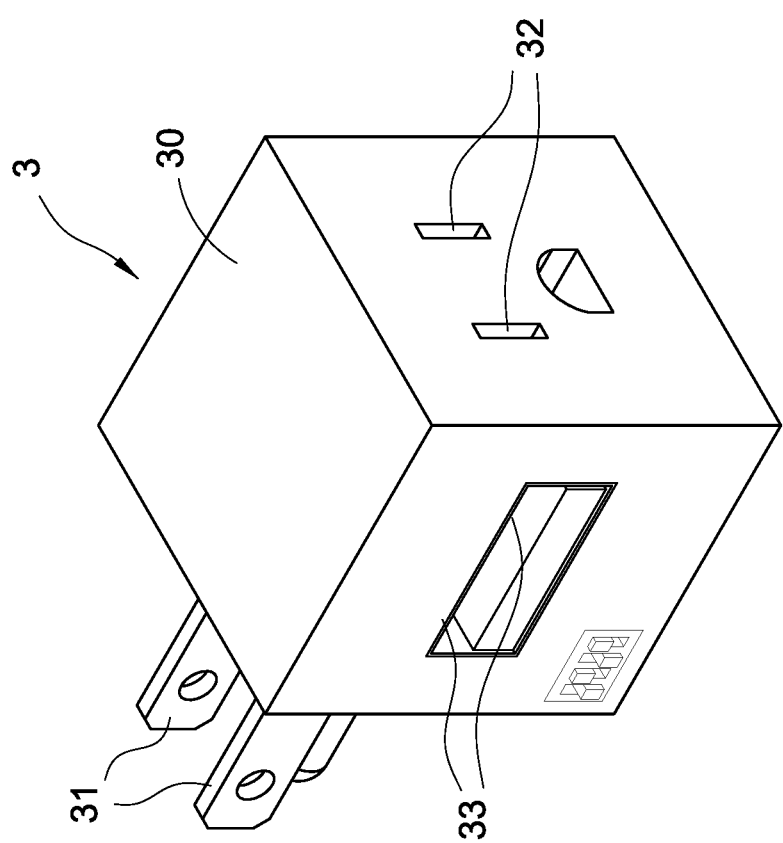
FIG. 5 is a perspective appearance diagram of the switched USB socket of the invention.
Figure 6:
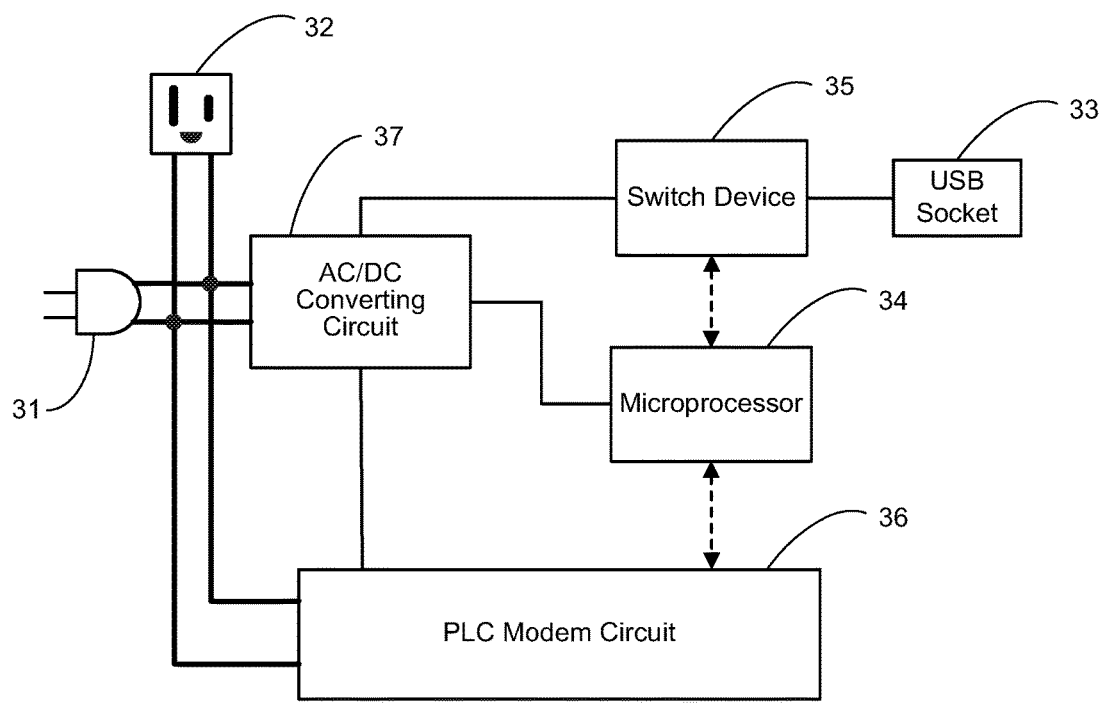
FIG. 6 is a circuit diagram of the switched USB socket of the invention.

Please refer to FIGS. 5 and 6, which are appearance diagram and circuit diagram of the switched USB socked module 3, respectively. The switched USB socket module 3 includes a housing 30. A power plug 31 is disposed on one side of the housing 30 for being inserted into a wall electricity socket. Another side of the housing 30 is provided with a power socket 32 which is electrically connected to the power plug 31 in parallel for being inserted by an electric apparatus to supply continuous AC power. A switched USB socket 33 is disposed on the housing 30. The inside of the housing 30 is provided with a microprocessor 34, a switch device 35, a PLC modem circuit 36 and an AC/DC converting circuit 37. The switch device 35 is a relay and electrically connected to the microprocessor 34 for being controlled to switch on/off by the microprocessor 34. The switched USB socket 33 is electrically connected to the switch device 35 for outputting electricity switched by the switch device 35. The PLC modem circuit 36 is electrically connected to the power plug 31 and the microprocessor 34 for receiving and demodulating a switch control signal from the power plug 31, modulating a status signal of the switched USB socket 33 from the microprocessor 34, and sending a modulated status signal to the power line network through the power plug 31. The AC/DC converting circuit 37 is electrically connected to the power plug for converting AC electricity from the power plug 31 into DC power to supply DC power to the microprocessor 34, the switch device 35 and the PLC modem circuit 36.

Figure 7:
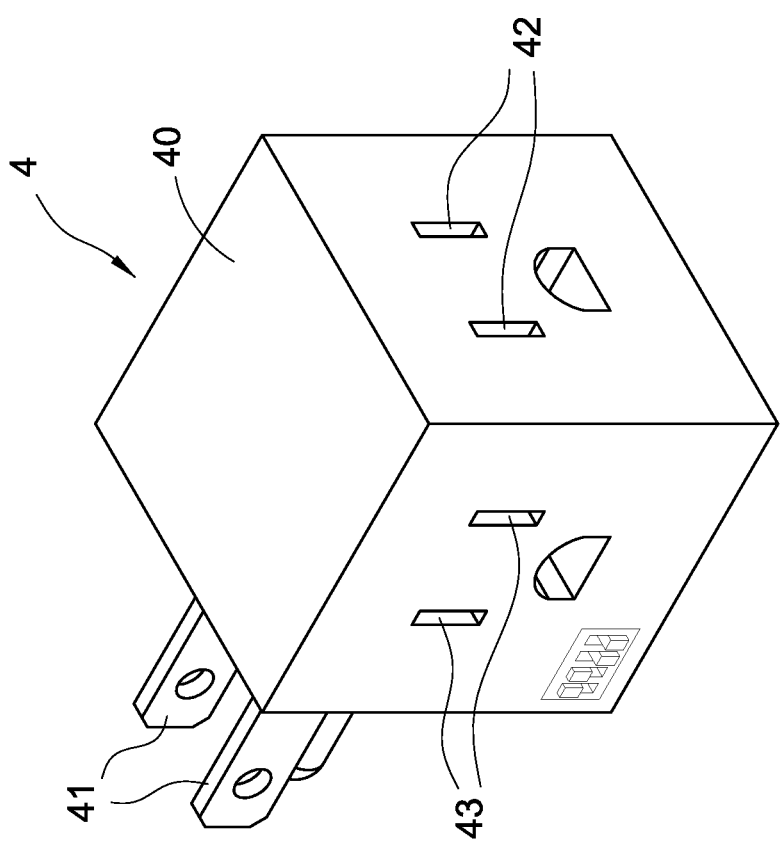
FIG. 7 is a perspective appearance diagram of the dimming power socket module of the invention.
Figure 8:
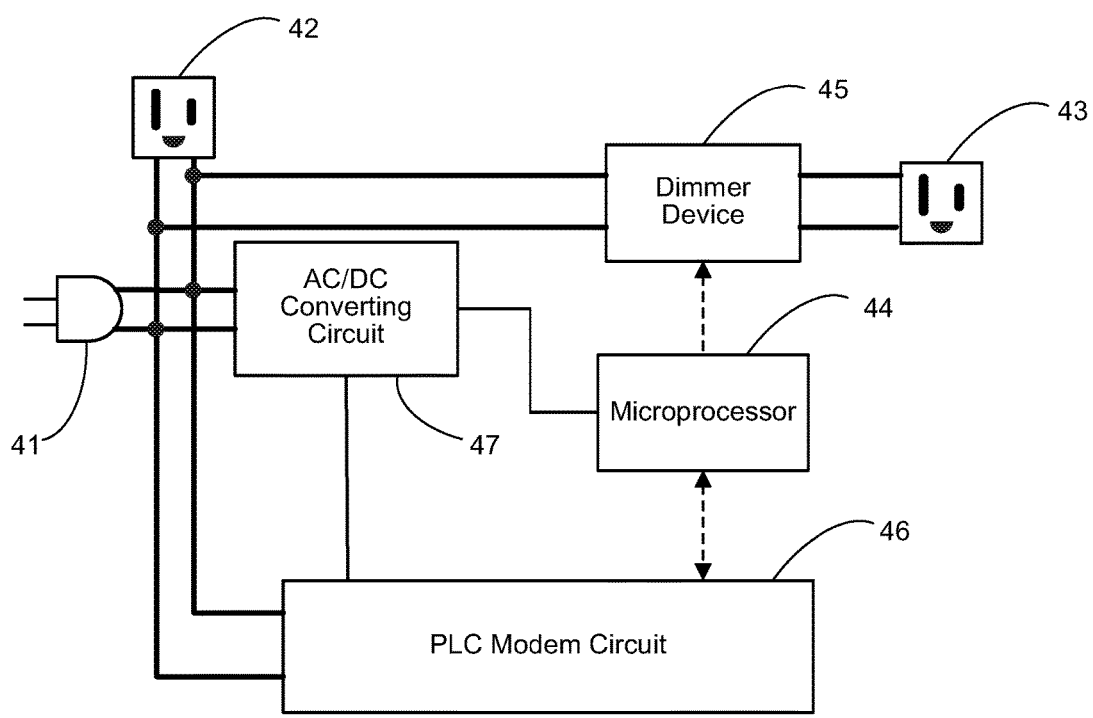
FIG. 8 is a circuit diagram of the dimming power socket module of the invention.

Please refer to FIGS. 7 and 8, which are appearance diagram and circuit diagram of the dimming power socked module 4, respectively. The dimming power socked module 4 includes a housing 40. A power plug 41 is disposed on one side of the housing 40 for being inserted into a wall electricity socket. Another side of the housing 40 is provided with a power socket 42 which is electrically connected to the power plug 41 in parallel for being inserted by an electric apparatus to supply continuous AC power. A dimming power socket 43 is disposed on another side of the housing 40 for supplying switching AC power. The inside of the housing 40 is provided with a microprocessor 44, a dimmer device 45, a PLC modem circuit 46 and an AC/DC converting circuit 47. The dimmer device 45 is a pulse width modulation (PWM) switching circuit electrically connected to the microprocessor 44 and the power plug 41 and controlled to change its electricity outputting waveform by the microprocessor 44. The dimming power socket 43 is electrically connected to the dimmer device 45 for outputting electricity switched by the dimmer device 45. The PLC modem circuit 46 is electrically connected to the power plug 41 and the microprocessor 44 for receiving and demodulating a dimming control signal from the power plug 43, modulating a status signal of the dimming power socket 43 from the microprocessor 44, and sending a modulated status signal to the power line network through the power plug 41. The AC/DC converting circuit 47 is electrically connected to the power plug 41 for converting AC electricity from the power plug 41 into DC power to supply DC power to the microprocessor 44 and the PLC modem circuit 46.

Figure 9:
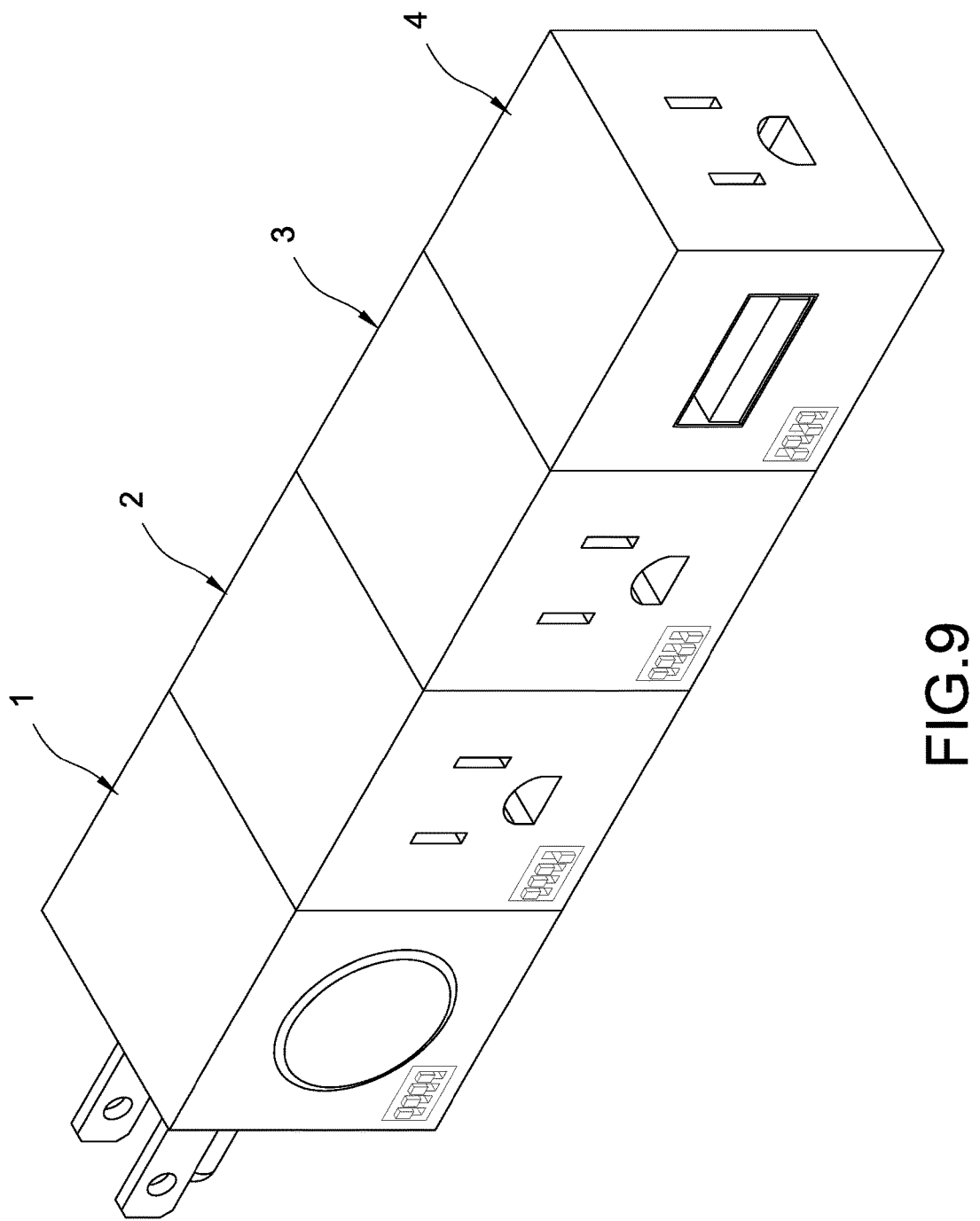
FIG. 9 is a perspective appearance diagram of the above four modules directly connecting in series.

The abovementioned four modules may be located at different power sockets within a electricity supply division, through power lines of which data can be interconnected. That is, the functional modules 2, 3, 4 can be controlled by the control module which receives a user's commands. Alternatively, as shown in FIG. 9, all modules 1, 2, 3, 4 may be connected to each other by inserting power plugs into power sockets. It should be noted that each module 1, 2, 3, 4 must be provided with a unique identification code (id code). The id code can be set by a DIP switch on the housing or by a proprietary software application installed in a handheld computer.

What is claimed is:

1. A combinable power socket system comprising:
   a control module comprising:
      a first housing;
      a first power plug, disposed on the first housing;
      a power socket, disposed on the first housing, and electrically connected to the first power plug;
      a first microprocessor, disposed in the first housing;
      a first power line communication (PLC) modulation/demodulation (modem) circuit, disposed in the first housing, electrically connected to the first power plug and the first microprocessor for modulating a control signal from the first microprocessor, sending a modulated control signal to a power line network, and receiving and demodulating a feedback signal from the power line network;
      a wireless communication circuit, disposed in the first housing, electrically connected to the first microprocessor for wirelessly connecting a handheld computer; and
      a first AC/DC converting circuit, disposed in the first housing, electrically connected to the first power plug for converting AC electricity from the first power plug into DC power to supply DC power to the first microprocessor, the first PLC modem circuit and the wireless communication circuit; and
   a switched power socked module comprising:
      a second housing;
      a second power plug, disposed on the first housing;
      an unswitched power socket, disposed on the second housing, and electrically connected to the second power plug;
      a second microprocessor, disposed in the housing;
      a switch device, disposed in the second housing, electrically connected to the second microprocessor and the second power plug, and being controlled to switch on/off by the second microprocessor;
      a switched power socket, disposed on the second housing, and electrically connected to the switch device for outputting electricity switched by the switch device;
      a second power line communication (PLC) modulation/demodulation (modem) circuit, disposed in the second housing, electrically connected to the second power plug and the second microprocessor for receiving and demodulating a switch control signal from the second power plug, modulating a status signal of the switched power socket from the second microprocessor, and sending a modulated status signal to a power line network through the second power plug; and
      a second AC/DC converting circuit, disposed in the second housing, electrically connected to the second power plug for converting AC electricity from the second power plug into DC power to supply DC power to the second microprocessor and the second PLC modem circuit;
   wherein the second power plug is capable of connecting to the power socket to make the power line network so that the switched power socked module is capable of being controlled by the control module.

2. The combinable power socket system of claim 1, wherein the wireless communication circuit is based on a Wi-Fi protocol.

3. The combinable power socket system of claim 1, wherein the switch device is a relay.

4. A combinable power socket system comprising:
   a control module comprising:
      a first housing;
      a first power plug, disposed on the first housing;
      a first power socket, disposed on the first housing, and electrically connected to the first power plug;
      a first microprocessor, disposed in the first housing;
      a first power line communication (PLC) modulation/demodulation (modem) circuit, disposed in the first housing, electrically connected to the first power plug and the first microprocessor for modulating a control signal from the first microprocessor, sending a modulated control signal to a power line network, and receiving and demodulating a feedback signal from the power line network;
      a wireless communication circuit, disposed in the first housing, electrically connected to the first microprocessor for wirelessly connecting a handheld computer; and
      a first AC/DC converting circuit, disposed in the first housing, electrically connected to the first power plug for converting AC electricity from the first power plug into DC power to supply DC power to the first microprocessor, the first PLC modem circuit and the wireless communication circuit; and
   a switched universal serial bus (USB) socket module comprising:
      a second housing;
      a second power plug, disposed on the second housing;

a second power socket, disposed on the second housing, and electrically connected to the second power plug;

a second microprocessor, disposed in the second housing;

a switch device, disposed in the second housing, electrically connected to the second microprocessor, and being controlled to switch on/off by the second microprocessor;

a switched USB socket, disposed on the second housing, and electrically connected to the switch device for outputting electricity switched by the switch device;

a second power line communication (PLC) modulation/demodulation (modem) circuit, disposed in the second housing, electrically connected to the second power plug and the second microprocessor for receiving and demodulating a switch control signal from the second power plug, modulating a status signal of the switched USB socket from the second microprocessor, and sending a modulated status signal to a power line network through the second power plug; and a second AC/DC converting circuit, disposed in the second housing, electrically connected to the second power plug for converting AC electricity from the second power plug into DC power to supply DC power to the second microprocessor, the switch device and the second PLC modem circuit;

wherein the second power plug is capable of connecting to the first power socket to make the power line network so that the switched USB socket module is capable of being controlled by the control module.

5. The combinable power socket system of claim 4, wherein the switch device is a relay.

6. A combinable power socket system comprising:
a control module comprising:
a first housing;
a first power plug, disposed on the first housing;
a power socket, disposed on the first housing, and electrically connected to the first power plug;
a first microprocessor, disposed in the first housing;
a first power line communication (PLC) modulation/demodulation (modem) circuit, disposed in the first housing, electrically connected to the first power plug and the first microprocessor for modulating a control signal from the first microprocessor, sending a modulated control signal to a power line network, and receiving and demodulating a feedback signal from the power line network;

a wireless communication circuit, disposed in the first housing, electrically connected to the first microprocessor for wirelessly connecting a handheld computer; and a first AC/DC converting circuit, disposed in the first housing, electrically connected to the first power plug for converting AC electricity from the first power plug into DC power to supply DC power to the first microprocessor, the first PLC modem circuit and the wireless communication circuit; and a dimming power socket module comprising:
a second housing;
a second power plug, disposed on the second housing;
an unswitched power socket, disposed on the second housing, and electrically connected to the second power plug;
a second microprocessor, disposed in the second housing;
a dimmer device, disposed in the second housing, electrically connected to the second microprocessor and the second power socket, and being controlled to change an electricity outputting waveform thereof by the second microprocessor;
a dimming power socket, disposed on the second housing, and electrically connected to the dimmer device for outputting electricity controlled by the dimmer device;
a second power line communication (PLC) modulation/demodulation (modem) circuit, disposed in the second housing, electrically connected to the second power plug and the second microprocessor for receiving and demodulating a dimming control signal from the second power plug, modulating a status signal of the dimming power socket from the second microprocessor, and sending a modulated status signal to a power line network through the second power plug; and
a second AC/DC converting circuit, disposed in the second housing, electrically connected to the second power plug for converting AC electricity from the second power plug into DC power to supply DC power to the second microprocessor and the second PLC modem circuit;

wherein the second power plug is capable of connecting to the power socket to make the power line network so that the dimming power socket module is capable of being controlled by the control module.

7. The combinable power socket system of claim 6, wherein the dimmer device is a pulse width modulation (PWM) circuit.

* * * * *